United States Patent
Sukegawa et al.

(10) Patent No.: US 6,722,340 B1
(45) Date of Patent: Apr. 20, 2004

(54) CYLINDER INJECTION ENGINE AND FUEL INJECTION NOZZLE USED FOR THE ENGINE

(75) Inventors: Yoshihiro Sukegawa, Hitachi (JP); Toshiharu Nogi, Hitachinaka (JP); Takuya Shiraishi, Hitachinaka (JP); Yoko Nakayama, Hitachi (JP); Yusuke Kihara, Hitachi (JP); Noboru Tokuyasu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/936,425

(22) PCT Filed: Jun. 11, 1999

(86) PCT No.: PCT/JP99/03130

§ 371 (c)(1),
(2), (4) Date: Sep. 13, 2001

(87) PCT Pub. No.: WO00/77360

PCT Pub. Date: Dec. 21, 2000

(51) Int. Cl.[7] .................................................. F02B 5/00
(52) U.S. Cl. .................... 123/305; 123/301; 239/533.12
(58) Field of Search ................................ 123/301, 302, 123/305, 295; 239/533.11, 533.12, 585.1–585.5

(56) References Cited

U.S. PATENT DOCUMENTS

| | | | |
|---|---|---|---|
| 5,740,777 A | 4/1998 | Yamamoto et al. | |
| 5,775,288 A | 7/1998 | Suzuki et al. | |
| 5,873,344 A | 2/1999 | Kudou et al. | |
| 5,878,712 A | 3/1999 | Wolters et al. | |
| 6,047,592 A | * 4/2000 | Wirth et al. .................. | 73/116 |
| 6,223,716 B1 | * 5/2001 | Kadota ......................... | 123/295 |
| 6,230,096 B1 | * 5/2001 | Nishimoto ................... | 701/113 |
| 6,276,472 B1 | * 8/2001 | Takashima et al. ......... | 180/65.2 |

FOREIGN PATENT DOCUMENTS

| | | |
|---|---|---|
| EP | 0875672 A2 | 11/1998 |
| JP | 1-267328 | 10/1989 |
| JP | 6-81656 | 3/1994 |
| JP | 9-14103 | 1/1997 |
| JP | 9-217644 | 8/1997 |
| JP | 9-317475 | 12/1997 |
| JP | 10-8967 | 1/1998 |
| JP | 10-30441 | 2/1998 |
| JP | 2748322 | 2/1998 |
| JP | 10-110660 | 4/1998 |
| JP | 10-110662 | 4/1998 |
| JP | 10-169447 | 6/1998 |
| JP | 10-212965 | 8/1998 |
| JP | 10-274133 | 10/1998 |
| JP | 10-288127 | 10/1998 |
| JP | 10-299537 | 11/1998 |
| JP | 10-331739 | 12/1998 |
| JP | 11-62593 | 3/1999 |
| JP | 11-141338 | 5/1999 |
| JP | 11-193722 | 7/1999 |
| JP | 11-200866 | 7/1999 |
| WO | WO 96/36808 | 11/1996 |

* cited by examiner

*Primary Examiner*—John Kwon
(74) *Attorney, Agent, or Firm*—Crowell & Moring LLP

(57) ABSTRACT

A fuel injector employed in a direct injection engine comprising a spark plug arranged on the top of a combustion chamber, a fuel injector located on said combustion chamber and an intake air control means installed on an intake manifold. A forward tumble air flow is formed in the combustion chamber by the intake air control means, and the fuel injector is available in two types; an annular (conical) spray type characterized by uniform density and a spray type characterized by high/low density. In the case of latter type, arrangement is made to ensure that the denser portion is placed face-to-face with the spark plug. Spray fuel rises along the wall surface of the combustion chamber on the intake side, and is carried to the spark plug by forward tumble air flow (called "tumble guide") moving from the fuel injector to the spark plug. This allows stratified charge combustion to be performed in the operation range from low to high speed ranges, with the result that discharge of gas containing hazardous gas component such as THC is reduced and fuel economy is improved.

1 Claim, 17 Drawing Sheets

IGNITION TIMING
※BTDC:35deg (AT ;1400rpm,Pi32Kpa)
※※ BTDC:30deg (AT ;3200rpm,Pi350Kpa)

(SPRAY SPECIFICATION)

SPRAY TOP END ANGLE $\gamma = \theta$ - INJECTOR INSTALLATION ANGLE $\alpha$ SPRAY
TOP END ANGLE $\gamma = \beta \pm 5°$

FIVE GROOVES

SIX GROOVES

15L: LOW SPRAY DENSITY AREA
15H: HIGH SPRAY DENSITY AREA

SPRAY DENSITY DISTRIBUTION
IN RADIAL DIRECTION

TEMPORAL CHANGE OF MIXED GAS
CONCENTRATION AROUND SPARK PLUG

SPRAY DENSITY DISTRIBUTION
IN RADIAL DIRECTION

SPRAY DENSITY DISTRIBUTION
IN RADIAL DIRECTION

L/D3 : SMALL    L/D3 : LARGE

SPRAY DENSITY

SPRAY CIRCUMFERENCE ANGLE  $\theta$

DEFINITION OF DEVIATION OF SPRAY DENSITY IN RADIAL DIRECTION $$\sigma = \frac{\sqrt{\int_0^{2\pi} (\rho_m - \rho)^2 \, d\theta}}{2\pi \rho_m} \times 100 \, (\%) \quad \text{-----} \quad (1)$$

(a) INTAKE STROKE (b) INTERMEDIATE OF COMPRESSION STROKE (c) LATER STAGE OF COMPRESSION STROKE

GENERATION OF SPRAY DENSITY DISTRIBUTION
DUE TO CHANGES IN SWIRLING GROOVE WIDTH

HOW TO DETERMINE THE DIRECTION OF
INSTALLING THE FUEL INJECTION VALVE

DIRECTION OF INJECTOR INSTALLATION
FOR THREE GROOVES

DIRECTION OF INJECTOR INSTALLATION FOR THE
GROOVE WITH UNEQUAL-SPACED PITCH

DIRECTION OF INJECTOR INSTALLATION
FOR ONE GROOVE

SPARK PLUG SIDE :
HIGH SPRAY DENSITY

PISTON PLUG SIDE :
LOW SPRAY DENSITY

HOMOGENIZATION OF SPRAYING BY CHANGES
IN THE OFFSET OF SWIRLING GROOVE

SPRAY HOMOGENIZATION MECHANISM

VERTICAL SECTION OF SPRAY
IMMEDIATELY AFTER INJECTION

VERTICAL SECTION OF SPRAY
IMMEDIATELY AFTER THE
LAPSE O

SPRAY HOMOGENIZATION BY CIRCULAR GROOVE

19: CIRCULAR GROOVE

CYLINDER INJECTION ENGINE AND FUEL INJECTION NOZZLE USED FOR THE ENGINE

TECHNICAL FIELD

The present invention relates to a direct injection engine and a combustion method for the engine, and particularly to a direct injection engine for direct injection of fuel into the combustion chamber forming a tumble air flow and the combustion method for this engine.

BACKGROUND ART

The direct injection engine of this type according to the prior art is disclosed in U.S. Pat. No. 5,878,712 and Japanese Application Patents Laid-Open Publication Nos.

Hei 10-110660, Hei 10-110662, Hei 10-30441, Hei 10-8967, Hei 6-81656, Hei 9-317475 and Hei 10-169447. In these direct injection engines of prior art, there is a difference of density in the fuel spray itself injected from the fuel injector into the combustion chamber, and this makes it difficult to collect fuel around the spark plug. Ignition performance is reduced when so-called lean burning method (lean or extra-lean burning) is used, wherein the minimum amount of fuel is used for burning. In this case, stratified charge combustion range cannot be expanded to cover a high speed traveling of 80 Km/hour or more or a high engine speed range of 2400 rpm.

In other words, there is a deviation of density in the fuel spray itself of the fuel injector. When the portion of smaller density is injected toward the spark plug, it becomes difficult to perform so-called stratified charge combustion where lean fuel is stratified and ignited; thus, stratified charge combustion is disabled.

To put it more specifically, when stratified charge combustion by tumble air flow is carried out in the light load/low speed range using the direct injection engine of prior art, the piston speed is increased if tumble air flow is produced in the combustion chamber in a light load/low speed range or a heavy load and high speed range (traveling at 120 km/h at an engine speed of 3200 rpm). Then it becomes difficult to ensure fuel evaporation time. Therefore, this makes it necessary to advance fuel injection time, but if the fuel injection time is advanced, spraying will be started when the pressure in the combustion chamber is still low. This leads to increased fuel spraying angle with the result that it becomes increasingly easier to agitate spray fuel with tumble air flow.

Furthermore, fuel may be deposited on the inner surface of the cylinder head, the inner surface of the combustion chamber or piston.

The direct injection engine of the prior art is designed to provide the step of uniform combustion wherein intake stroke injection is performed in the heavy load and high speed range and the generation of tumble air flow is discontinued, thereby allowing fuel to be diffused throughout the entire combustion chamber.

In this case, however, sprayed fuel is deposited on the upper surface of the piston or internal wall surface of the combustion chamber, and mixture with air is hindered, with the result that combustion does not take place due to delayed evaporation of the deposited spray fuel, and fuel is discharged from the engine together with exhaust gas. This tendency is conspicuous in this case.

This results in an increased amount of the unburnt hydrocarbon (THC) and reduced engine performance and fuel economy.

The object of the present invention to provide a direct injection engine characterized by improved engine ignition in a light load/low speed range as in idling operation range and by stratified charge combustion ensured in the operation range from a low to high speed ranges, thereby reducing discharge of gas containing hazardous component such as THC and improving fuel economy.

DISCLOSURE OF THE INVENTION

To achieve the above object, the present invention is characterized by following configuration: ① Fuel spray injected from fuel injector presents an annular form with uniform density when viewed from the surface perpendicular to the spray axis line.

To put it more specifically, a valve body mounted on the valve seat of the fuel injection nozzle and a fuel swirling element having a through-hole for guiding this valve body are provided on the nozzle of the fuel injector. This fuel swirling elements are provided with five or more swirling grooves which are arranged in the radial direction at specified intervals. These swirling grooves are formed at positions offset by a specified amount in parallel with a virtual radial line passing through the centerline of the fuel injection nozzle.

To put it more specifically, the valve body of the fuel injector is formed in a spherical shape, and the diameter $D1$ of this valve body and the diameter $D2$ of the through-hole of fuel swirling element has the relation of $D2 \approx 1.005 D1$, and the diameter $D3$ of the fuel injection nozzle and length $L$ has the relation of $L/D3 > 1$.

② The following describes another way of achieving the above object in the present invention: The fuel spray injected from the fuel injector exhibits a high/low density when viewed from the surface perpendicular to the spray axis line. The fuel injector is mounted on the combustion chamber so that the denser portion is placed face-to-face with the spark plug.

To put it more specifically, an air flow is formed to move from the fuel injector arranged on the side of the combustion chamber toward the spark plug arranged on the top of the combustion chamber. Just before ignition timing, fuel is sprayed from the fuel injector, and fuel spray is carried by this air flow to reach the spark plug exactly at the ignition timing of spark plug (hereinafter referred to as "tumble guide method"). At the same time, fuel spray injected from the fuel injector presents an annular form with uniform density when viewed from the surface perpendicular to the spray axis line, where the deviation σ of the fuel density of this annular fuel spray in the radial direction is smaller than 15%.

To put it more specifically, an air flow is formed which moves from the fuel injector installed on the side of the combustion chamber toward the spark plug arranged on the top of the combustion chamber, and fuel is injected from the fuel injector slightly before ignition timing. Fuel spray is carried by this air flow to reach the spark plug exactly at the ignition timing of spark plug (hereinafter referred to as "tumble guide method"). The fuel spray injected from the fuel injector exhibits a high/low density when viewed from the surface perpendicular to the spray axis line. The fuel injector is mounted on the combustion chamber so that the denser portion is placed face-to-face with the spark plug. The first invention configured as described above makes it possible to ensure that the combustion performance of the direct injection engine is not affected by fuel injector installation position.

The second invention allows concentrated fuel to be supplied to the spark plug, thereby improving the performance of the direct injection engine.

In the specific invention, spray fuel is carried by the tumble air flow and is sent to the spark plug mounted on the cylinder head (tumble guide method). This reduces the spray fuel feed distance and the amount of spray fuel deposited on the top surface of the piston or inner wall of the cylinder, and improves the density of the spray fuel close to the spark plug, thereby ensuring improved ignition by the spark plug.

As a result, this reduces the amount of THC in exhaust gas, and improves the purification rate and fuel economy at the same time.

BEST FORM OF EMBODIMENT OF THE INVENTION

Figure 1:
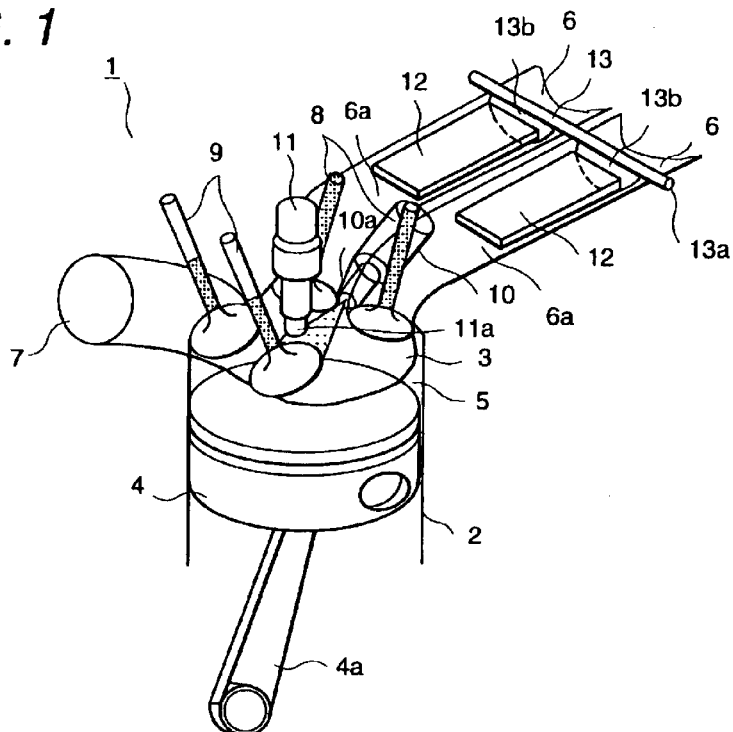
FIG. 1 is a perspective and conceptual cross sectional view of a direct injection engine as a first embodiment according to the present invention.

The following describes the embodiments of the direct injection engine according to the present invention with reference to drawings:

FIG. 1 is a perspective and conceptual cross sectional view of a direct injection engine as a first embodiment according to the present invention. A cylinder block 2 is mounted on the bottom of each cylinder of an engine body 1, and a cylinder head 3 is mounted on the top of the cylinder block 2.

A piston 4 having the top surface designed in an almost flat shape is provided inside the cylinder block 2 slidably in the vertical direction, and the space between the cylinder block 2 and the piston 4 is formed as a combustion chamber 5. The cylinder head 3 is designed as a pent roof, and the cylinder head 3 is connected with two intake manifolds 6 and 6 opening into the combustion chamber 5, and two exhaust pipes 7 and 7. Intake valves 8 and 8 are respectively arranged on intake manifolds 6 and 6 at the connection with the cylinder head 3, and exhaust valves 9 and 9 are respectively arranged on the exhaust pipes 7 and 7.

A fuel injector 10 for injecting fuel directly into the engine cylinder is installed between two intake valves 6 and 6 of the above-mentioned cylinder head 3, with its injection nozzle (injection point) 10a facing the combustion chamber 5. The fuel injector 10 is a high pressure swirling fuel injector designed to have such a shape that a conical form at the specified spray angle is obtained by giving a swirling force to the spray fuel. The fuel spray angle of the injected spray fuel tends to decrease with the increase in the pressure inside the above-mentioned combustion chamber 5. A spark plug 11 is arranged at the central position on top of the cylinder head 3, with an electrode 11a forming an ignition gap facing the combustion chamber 5.

The intake valves 8 and 8 and exhaust valves 9 and 9 are moved in the vertical direction by the cam shaft (not illustrated) positioned on the top of cylinder head 3, thereby opening or closing the communicating valve holes between the intake manifolds 6 and 6 and exhaust pipes 7 and 7 formed on the cylinder head 3. Through a connecting rod 4a, the piston 4 is connected and interlocked with the crank shaft (not illustrated) which is shaft-supported rotatably on the bottom of the cylinder block 2. As the piston 4 is moved inside the cylinder block 2 in the vertical direction by the operation of the engine, the crank shaft is driven and rotated.

Two intake manifolds 6 and 6 upstream from intake valves 8 and 8 are provided with rectifier plates 12 and 12 for separating the intake flow path of intake manifolds 6 and 6 into top and bottom. Flow dividing valves 13 and 13 are arranged upstream from the rectifier plates 12 and 12 to serve as intake air control means. The flow dividing valves 13 and 13 comprises a valve shaft 13a and valve body 13b, and is arranged to ensure that the valve body 13b is moved within the range of 90 degrees from the position immediately below to the immediate side by rotating the valve shaft 13a. The flow dividing valves 13 and 13 are used to control the velocity and direction of air flow formed in the combustion chamber 5. When the air flow velocity is to be increased, the bottom flow paths 6a and 6a of the flow paths separated into two parts are blocked by the flow dividing valves 13 and 13. Then the area of the flow paths in the intake manifolds 6 and 6 is decreased, namely, a forward tumble air flow is formed in the combustion chamber. When the velocity of air flow formed in the combustion chamber 5 is not to be increased, or much air is to be sucked from the combustion chamber 5, the flow dividing valves 13 and 13 are closed, and the bottom flow paths 6a and 6a are released.

Figure 2:
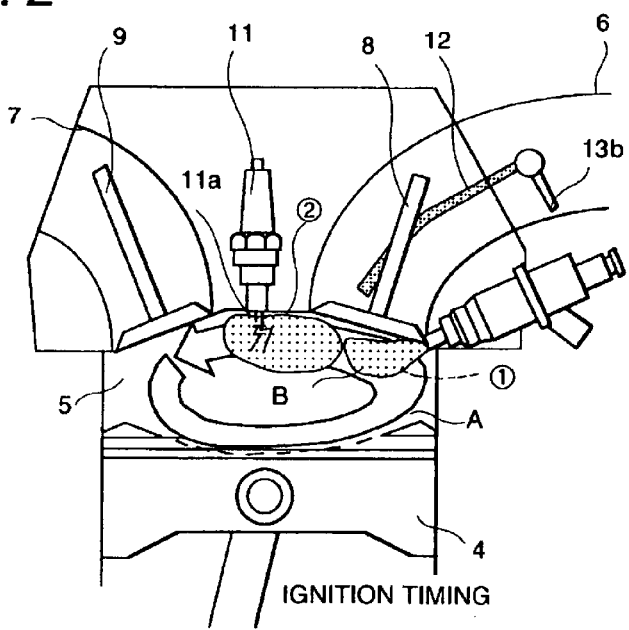
FIG. 2 is a drawing representing the status of the forward tumble air flow sucked into the combustion chamber of the direct injection engine of FIG. 1, and fuel spray.

FIG. 2 shows the status of the tumble air flow sucked into the combustion chamber 5 of the direct injection engine of according to the present embodiment, and fuel spray. When flow dividing valve 13 is closed and air flow is sucked into the combustion chamber 5 only from the top flow path 6b on the intake manifold 6, the state of forward tumble air flow shown by the arrow A occurs in the combustion chamber 5. This air flow moves on the top surface of the piston and rises along the wall surface (cylinder wall surface) of the combustion chamber on the intake side. The fuel injected from the fuel injector 3 produces a conical spray which is longer on the plug side and shorter on the piston side, as in the case of spray fuel B (15). The conical spray fuel B is carried by the tumble air flow to the ignition gap of the electrode 11a of spark plug 11. Let us call it a tumble guide method.

The tumble air flow A rises from the bottom of the fuel injector, and spray fuel B is carried by the tumble air flow A moving from the fuel injector 10 to the spark plug to reach the electrode 11a of the spark plug 11. For example, the engine speed is equivalent to 1400 rpm, the spray fuel reaches the electrode 11a of the spark plug 1 3.15 msec after fuel is injected from the fuel injector 10. ① in FIG. 2 indicates that the fuel is injected prior to time of plug ignition. ② shows that fuel is carried to the plug by tumble air flow.

Under the condition of ②, ignition signal is just sent to the plug, and ignition timing is reached. To put it more specifically, when mean effective pressure in the combustion chamber is 320 KPa (kilo-Pascal) at the engine speed of 1400 rpm, fuel is injected at 70 deg. in BTDC (before top dead point), and ignition timing is at 35 deg. in BTDC (before top dead point). When mean effective pressure in the combustion chamber is 350 KPa at the engine speed of 3200 rpm, fuel is injected at 80 deg. in BTDC (before top dead point), and ignition timing is at 30 deg. in BTDC (before top dead point). In both cases, fuel is injected about 3 msec. before ignition timing. This time has been measured in various operation ranges, and it has been revealed that injection of fuel 3.0 to 3.15 msec. before is satisfactory.

Figure 3:
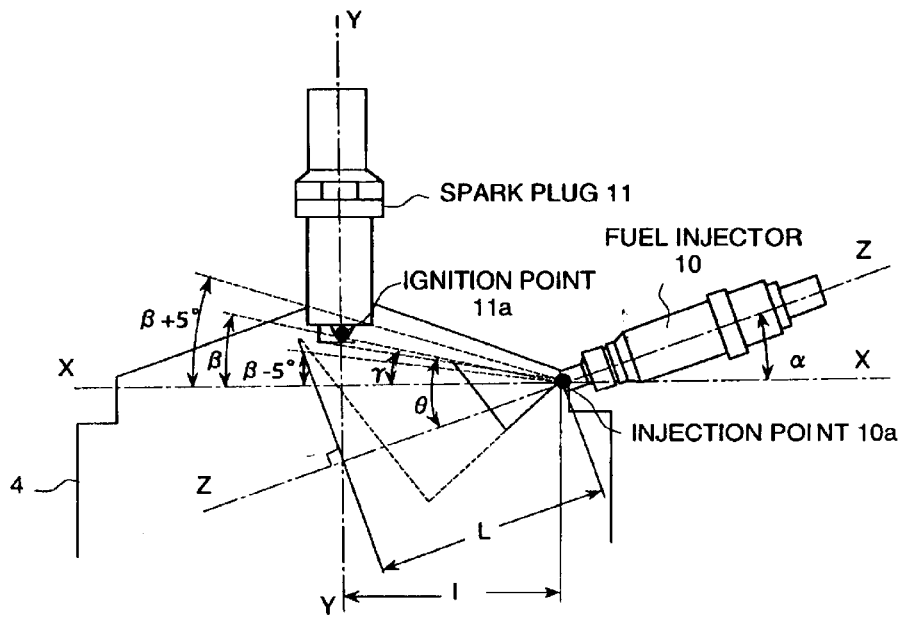
FIG. 3 is a drawing representing the positional relationship between the spark plug and fuel injector of the direct injection engine of FIG. 1, the fuel injector spraying state, and the positional relationship between the ignition gap and spark plug electrode.

FIG. 3 shows the positional relationship between the spark plug 11 and fuel injector 10 of the direct injection engine according to the present embodiment, and the positional relationship between the injection nozzle (injection point) 10a of the fuel injector 10 and the ignition gap (ignition point) of electrode 11a of spark plug 11.

The spark plug 11 is arranged in the vertical direction with its axis center Y in the longitudinal direction matching with that of the engine block 2. The fuel injector 10 is arranged with its axis center Z inclined by angle (injector installation angle) α with respect to the axis line X at a right angle to the axis center Y and passing through the axis center Y, where the injection nozzle 10a of the fuel injector 10 is used as a reference point. The ignition gap (ignition point) of the electrode 11a of the spark plug 11 is positioned at angle β with respect to the axis line X where the injection nozzle (injection point) 10a of the fuel injector 10 is used as a reference point. Spray injected from the fuel injector 10 has a conical form, and is injected at a fuel spray angle θ o (angle formed by the axis center Z and spray top edge F). The angle formed by the axis line X and spray top edge is assumed as a spray top end angle γ. Spray is generated so that the distance for the arrival of the conical spray is longer than positional distance between the injection nozzle 10a and the electrode 11a. If the fuel spray angle θ o is determined, angle α0 and angel β0 is preset by the cylinder of each engine as shown in FIG. 3. Therefore, spray top end angle γ can be obtained from θ o−α=γ. This makes it possible to determine the spray top end angle γ with respect to the predetermined angle β, namely, to determine the positional relationship between the spray top edge F of the spray fuel and the electrode 11a of the spark plug 11.

Figure 4:
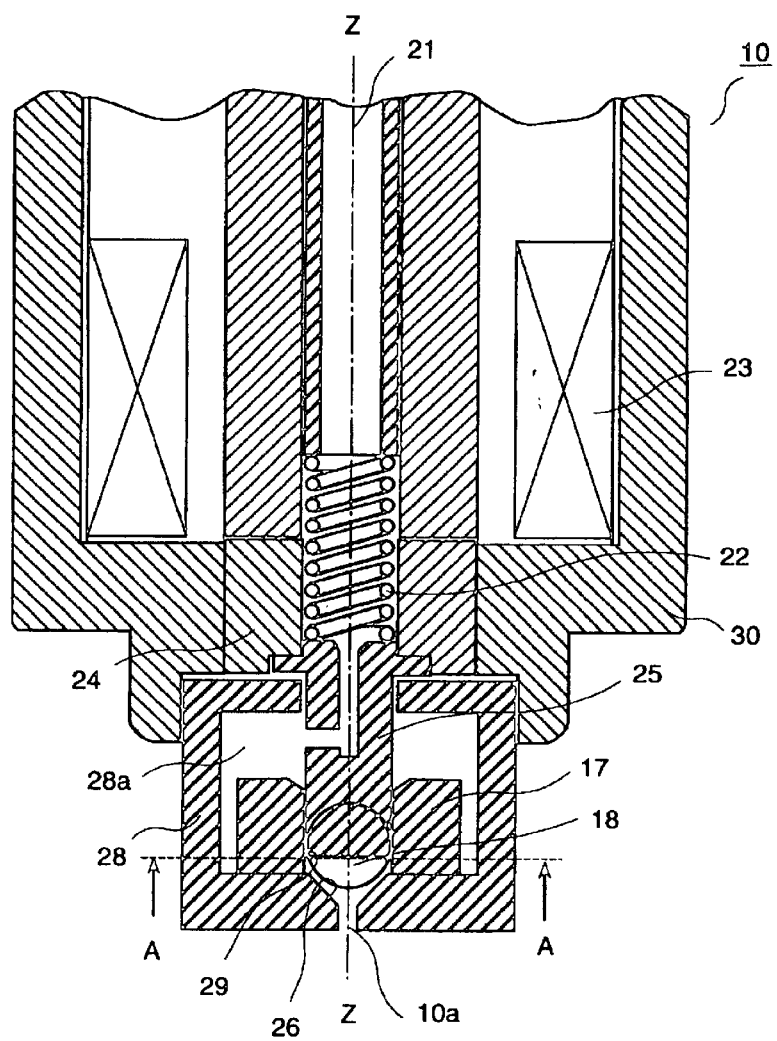
FIG. 4 is a vertical cross sectional view representing the nozzle of the fuel injector mounted on the direct injection engine of FIG. 1.
Figure 5:
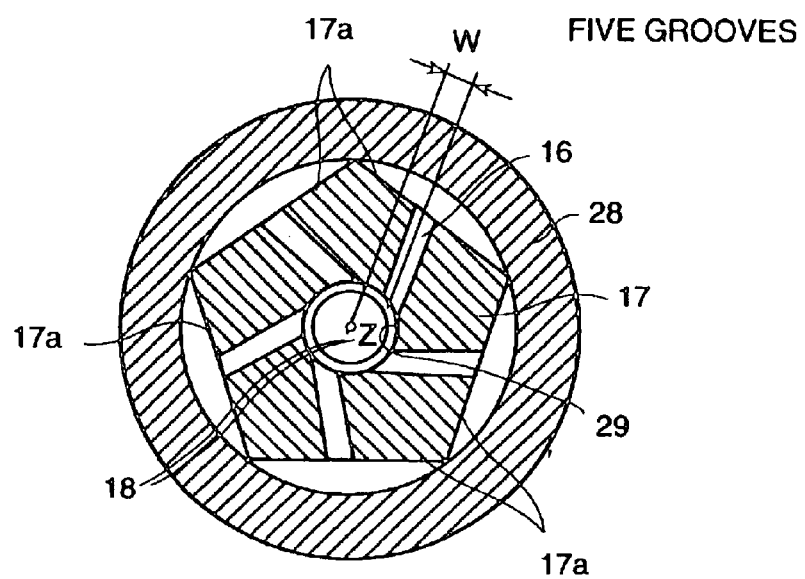
FIG. 5 is a transverse cross sectional view showing the view A—A of the nozzle of the fuel injector mounted on the direct injection engine of FIG. 4.

FIGS. 4 and 5 show the drive unit and injection nozzle of the fuel injector 10 of the direct injection engine according to the present embodiment. FIG. 4 shows the vertical cross sectional view of the drive unit and injection nozzle of the fuel injector 10. FIG. 5 is a transverse cross section view showing the view A—A of the nozzle of FIG. 4. On the axis line X, the drive unit and injection nozzle of the fuel injector 10 is provided with a fuel passage 21 for leading to the injection nozzle 10a of the nozzle 30 the fuel supplied from the fuel source. The nozzle 30 is provided with;

- a magnetic movable element 24,
- a compressed coil spring 22,
- a nozzle case 28 with built-in fuel storage space 28a,
- a valve shaft 25 which moves integral with magnetic movable element 24 and which extends to the fuel storage space 28a in the nozzle case 28,
- a spherical valve body 18 which is fixed to the tip of the valve shaft 25 and which is mounted on the valve seat 26 of the injection nozzle 10a, and
- a fuel swirling member 17 of annular form arranged around the valve body 18.

As shown in FIG. 5, the fuel swirling member 17 is pentagonal in its external form and has a round hole 29 at the center. It has five swirling grooves 16 which are offset by specified dimensions with respect to the line W extending radially from each side 17a of the pentagon to the round hole 29. In the round hole 29, the valve shaft 25 and the valve body 18 are loose-fit to be movable in the vertical direction at specified intervals.

The spherical valve body 18 of the fuel injector 10 is nominally energized in the downward direction by the compressed coil spring 22 and is seated on the valve seat 26. The fuel flowing from the fuel passage 21 is led to the fuel storage space 28a and is supplied to the round hole 29 from swirling grooves 16, . . . of the fuel swirling member 17. When fuel is to be injected from the injection nozzle 10a of the fuel injector 10 in the above-mentioned state, the magnetic solenoid 23 is excited to energize the magnetic movable element 24 in the vertical direction. Then the valve body 18 is moved upward in resistance against the energized force of the compressed coil spring 22, and the valve body 18 goes away from the valve seat 26. Then fuel is sprayed from the injection nozzle 10a. When the fuel is injected, the fuel led to the injection nozzle 10a is supplied through the swirling grooves 16, . . . of the fuel swirling member 17 which are offset by a specified dimension. So when it is injected from the injection nozzle 10a, it is sprayed in an almost conical form.

The near-conical spray fuel is injected through five swirling grooves 16, . . . so that a swirl occurs to the fuel. Depending on the position of the conical form in the radial direction, a difference occurs in the fuel density distribution. In the present embodiment, the number of swirling grooves 16, . . . is five, and is greater than the number of the grooves of prior art (for example, four grooves). This reduces the difference in the fuel density distribution in the radial direction, and makes the fuel density distribution in the radial direction homogeneous.

Figure 6:
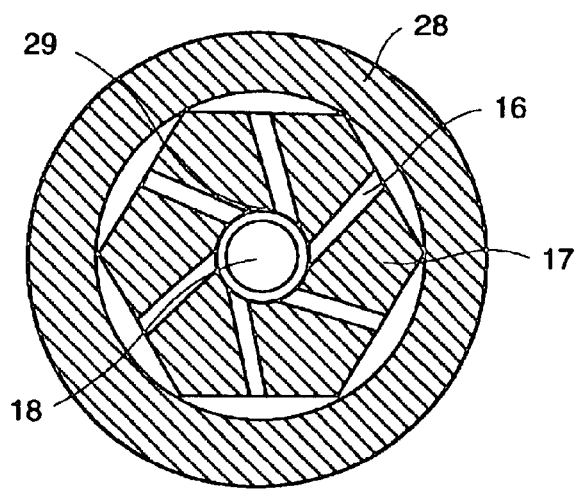
FIG. 6 is a transverse cross sectional view representing the nozzle having a different number of swirling grooves from that of FIG. 4, in another example of a fuel injector according to the first embodiment.

FIG. 6 shows another specific example of the present embodiment wherein six swirling grooves 16, . . . are formed on the fuel swirling member 17 of the fuel injector 10. It is a transverse cross sectional view similar to FIG. 5. Compared with use of five swirling grooves 16, . . . , use of six swirling grooves 16, . . . further reduces the difference in the density distribution of the conical spray fuel in the radial direction, and makes the fuel density distribution in the radial direction more homogeneous.

Figure 7:
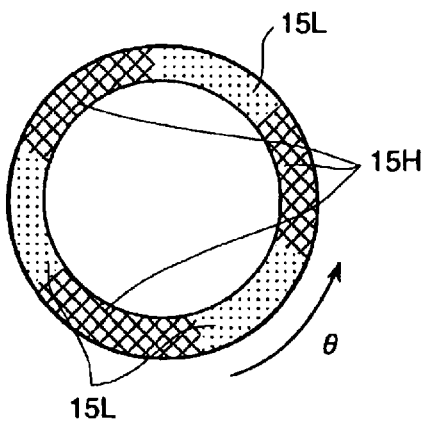
FIG. 7 is a drawing representing the spray fuel density distribution with three swirling grooves in a fuel injector according to the prior art.

FIG. 7 shows the transverse cross section of conical spray fuel injected form the normal fuel injector where three swirling grooves are formed on the fuel swirling member. As is apparent from FIG. 7, in the case of three swirling groove, the difference in fuel density distribution is clear from the difference in angular position θ of the conical spray fuel in the radial direction. Injection is carried out with a clear distinction between low spray density portion 15L and high spray density portion 15H in the radial direction.

Figure 8:
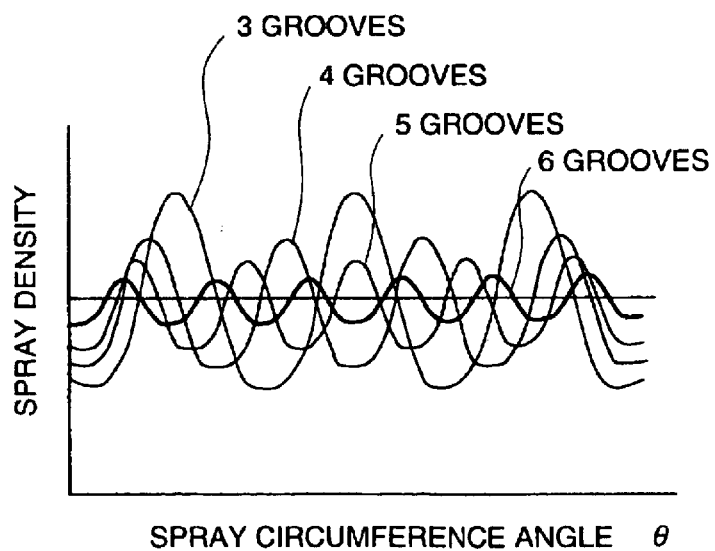
FIG. 8 is a drawing representing the relationship between spray angle θ in the radial direction and spray density based on the difference in the number of swirling grooves formed on the swirling member of the fuel injector.

FIG. 8 shows the relationship between spray angle θ in the radial direction and spray density based on the difference in the number of swirling grooves formed on the swirling member of the fuel injector. In FIG. 8 the X axis represents the spray angle θ in the radial direction, and the Y axis indicates spray density. Five or six grooves in the present embodiment give a smaller difference in density distribution of conical spray fuel in the radial direction than three or four grooves of the prior art. This shows that more homogeneous spraying is provided in the radial direction in the present embodiment.

Figure 9A:
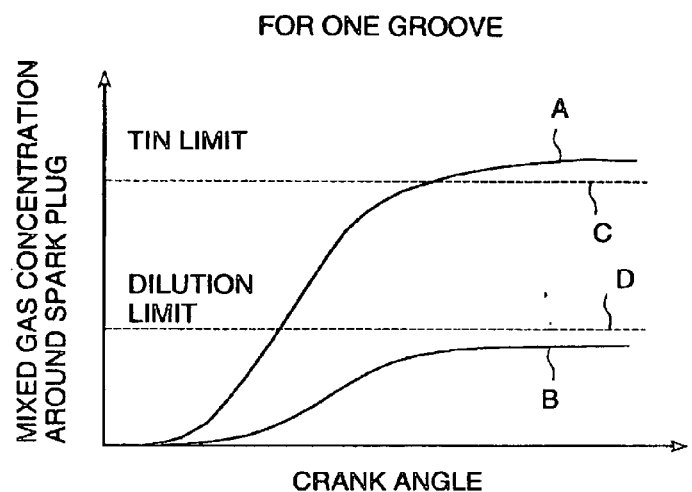
FIGS. 9(a) and 9(b) are drawings representing the concentration of air/fuel mixture with respect to changes of time (crank angle) close to the electrode of the spark plug during engine operation.
Figure 9B:
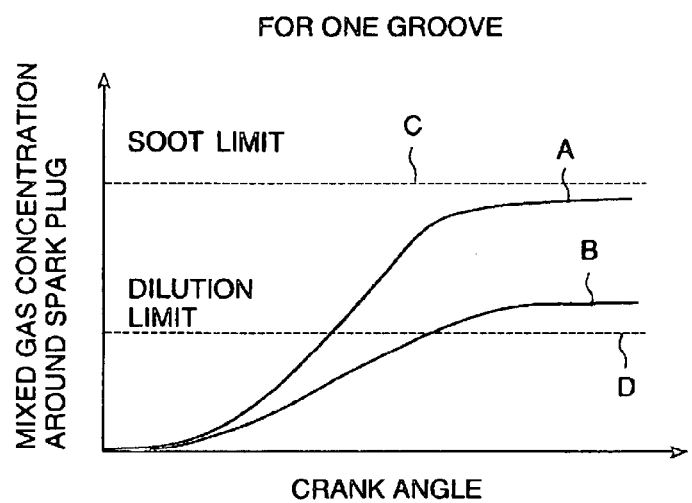

FIG. 9 represents the concentration of air/fuel mixture with respect to changes of time (crank angle) close to the electrode of the spark plug during engine operation. (a) indicates the case where one swirling groove is formed on the fuel swirling member of the direct injector. (b) indicates the case where five swirling grooves are formed.

In FIG. 9, A shows the high spray density portion of conical spray fuel injected from the fuel injector, while B indicates the low spray density portion. The fuel injector with one groove contains the time period when the critical concentration C is exceeded, wherein soot is produced on the high spray density portion during combustion on the one hand. On the low spray density portion 15L, on the other hand, concentration is reduced below the critical dilution concentration D where ignition failure may occur. This indicates that the difference in concentration of the conical spray fuel in the radial direction is high. However, for the fuel injector having five grooves according to the present embodiment in (b), both the high spray density portion A and low spray density portion B exhibit concentration below the critical soot concentration C and over the dilution limit D. The difference in concentration of conical spray fuel in the radial direction is low, suggesting that concentration of the conical spray fuel in the radial direction is homogenous.

Figure 10A:
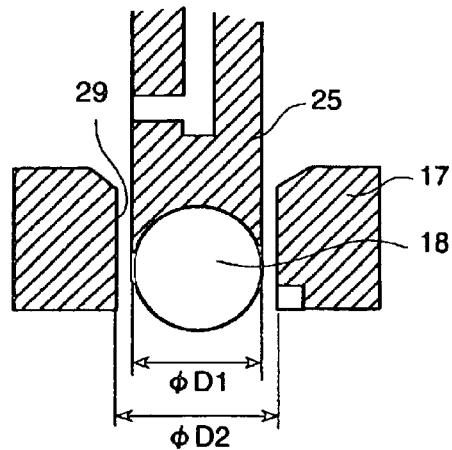
FIGS. 10(a) and 10(b) are drawings representing the conical spray fuel density distribution in the radial direction based on the difference between the diameter of the circular hole of the fuel swirling member of a fuel injector and the diameter of a spherical valve body.
Figure 10B:
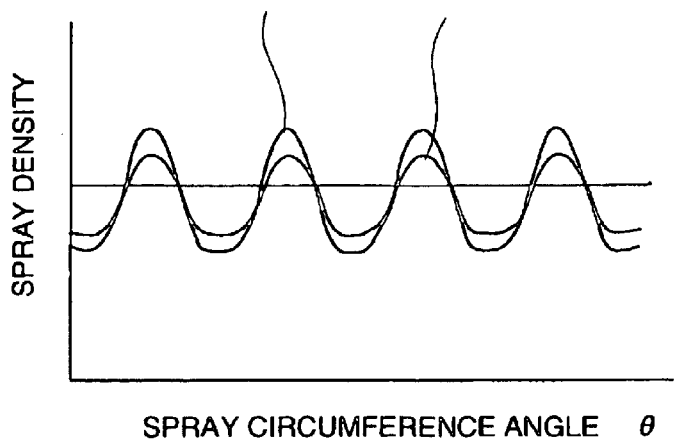

FIG. 10 shows the conical spray fuel density distribution in the radial direction based on the dimensional relationship between the circular hole of the fuel swirling member 17 (with five grooves) and spherical valve body. (a) indicates the relationship between the diameter D2 of the round hole 29 and the diameter D2 of the spherical valve body 18. As shown in (b), the difference in the fuel spray density in the radial direction is increased as the difference in diameters between the round hole 29 and valve body 18 is increased, namely, as the space between the round hole and spherical valve body is increased. This means that the difference in the diameters between the round hole and spherical body is preferred to be smaller for the fuel spray density in the radial direction. The result of the experiment has shown that the difference in fuel spray density in the radial direction is the minimum if the diameter D2 of the round hole 17 with respect to the diameter D1 of the spherical valve body 18 is D2=1.005 D1.

Figure 11A:
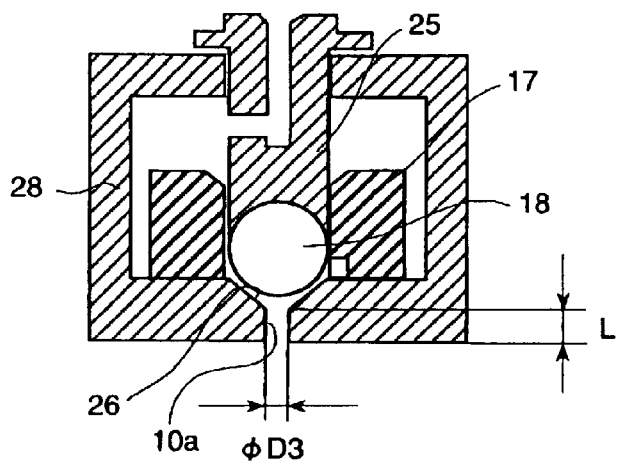
FIGS. 11(a) and 11(b) are drawings representing the conical spray fuel density distribution in the radial direction based on the difference of the length of the injection nozzle of the fuel swirling member of a fuel injector with respect to its diameter.
Figure 11B:
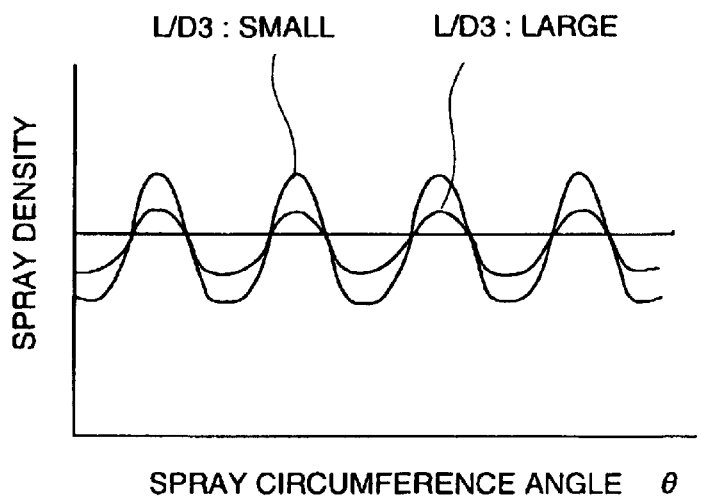

FIG. 11 represents the conical spray fuel density distribution in the radial direction based on relationship between the diameter and length of the injection nozzle of the fuel swirling member 17 (with five grooves) of the fuel injector 10. (a) indicates the relationship of length L of the injection nozzle 10a with respect to diameter D3 of the injection nozzle 10a. As shown in (b), difference in fuel spray density in the radial direction is greater as the length L of the injection nozzle 10a with respect to diameter D3 is smaller. This means that the length L of the injection nozzle of fuel injector with respect to diameter D3 is preferred to be greater for the fuel spray density in the radial direction. The result of the experiment has shown that the difference in fuel spray density in the radial direction is reduced if the diameter D3 and length L of the injection nozzle 10a has the relation of L/D3>1.

Figures 12A, 12B:
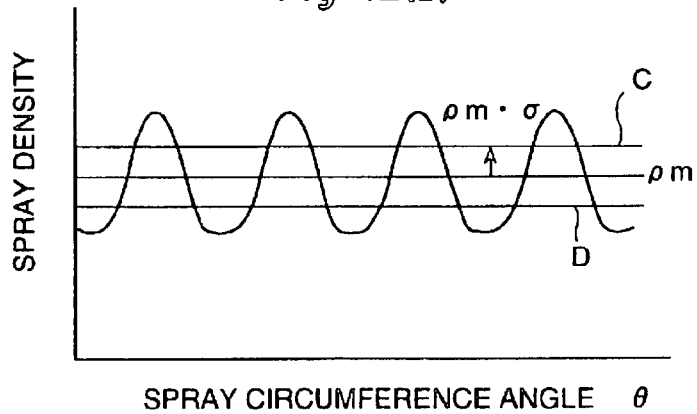
FIGS. 12(a) and 12(b) are drawings illustrating the deviation of the fuel density in the radial direction of the conical spray fuel injected from the fuel injector.

FIG. 12 illustrates the deviation of the density in the radial direction of the conical spray fuel injected from the fuel injector 10. (a) indicates the equation for deriving the deviation of fuel density, and (b) shows the relationship between spray angle θ in the radial direction and spray density. In Equation (1) of (a), ρ denotes density, ρm average density and a density deviation. In (b), C denotes a critical soot density and D a critical dilution density.

Normally, if ρm=1 where average density is ρm, critical soot density C and critical dilution density D are considered to be within the range of ±0.5. Thus, density ρ in the sinusoidal curve of the spray density falling within the range of critical soot density C and critical dilution density D is assumed as ρ=f(θ), and f(θ) =0.5 sin θ+1. Substituting it into Eq. (1) gives the following result: Permissible deviation a of fuel density is expressed as σ=14.3%. Thus, to ensure that the fuel density of the conical spray fuel in the radial direction is located within the permissible range between critical soot density C and critical dilution density D, deviation σ of spray fuel density must satisfy σ<15%.

Figure 13:
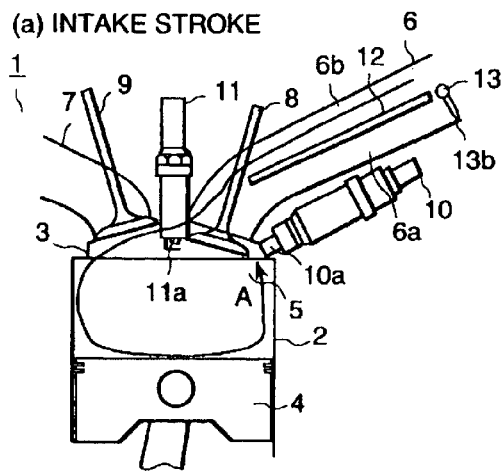
FIGS. 13(a)–13(c) are drawings illustrating the state of each stroke of the operations of the direct injection engine of FIG. 1, wherein FIG. 13(a) denotes an intake stroke, FIG. 13(b) the former stage of the compression stroke and FIG. 13(c) the latter stage of the compression stroke.
Figure 13:
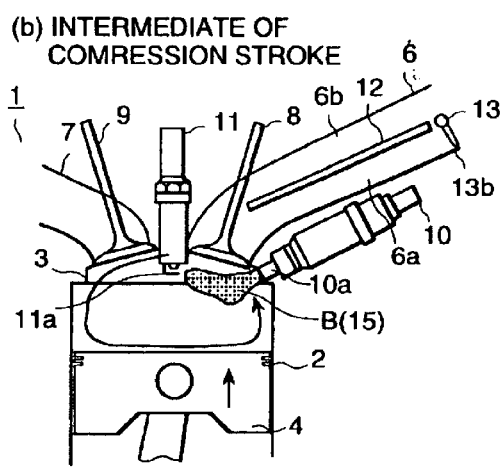
Figure 13:
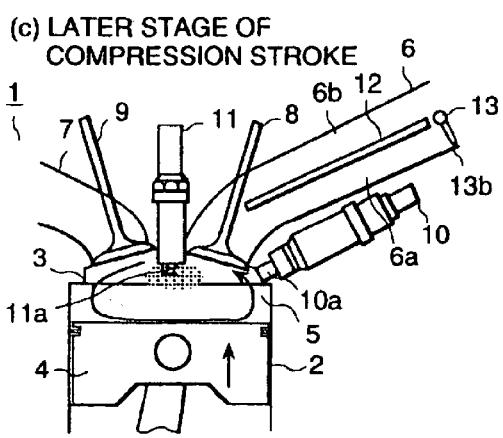

FIG. 13 illustrates the state of each stroke of the operations of the direct injection engine according to the present embodiment equipped with the above-mentioned fuel injector, wherein (a) denotes an intake stroke, (b) the former stage of the compression stroke and (c) the latter stage of the compression stroke.

In the direct injection engine according to the present embodiment, the valve body 13b of the flow dividing valve 13 in the intake valve 6 is closed in the intake stroke and intake valve 8 is opened. Then the sucked air is sucked into the combustion chamber 5 only from the top flow path 6b of the intake valve 6. Air taken into the combustion chamber 5 flows into the combustion chamber 5 as forward tumble air flow, as shown by the arrow mark A. In the former stage of the compression stroke (b), the piston 4 starts to rise and fuel is injected from the injection nozzle 10a of the fuel injector 10 (BTDC 70 to 90 deg.). In this case, the fuel swirling member 17 of the nozzle 30 of the fuel injector 10 according to the present embodiment is provided with five or six swirling grooves 16. The fuel density at the annular portion on the top of the conical spray fuel to be injected is homogenized in the radial direction. The spray fuel is sprayed at an adequate strength to the outer layer of the above-mentioned tumble air flow, and is carried by the tumble air flow. In the latter stage of the compression stroke (c), the piston 4 further rises, and sprayed fuel is fed in the vicinity of the electrode 11a of the spark plug 11 by the tumble air flow. It is ignited by the electrode 11a of the spark plug 11 (BTDC 30 to 35 deg.).

As described above, in the direct injection engine according to the present embodiment, fuel is sprayed to the outer layer of the above-mentioned tumble air flow, and is carried by the tumble air flow to the plug. Under this condition, it is compressed by the piston 4, so air and fuel are ignited in the stratified state. The density of conical spray fuel sprayed from the fuel injector 10 from the fuel injector 10 is homogenized in the radial direction. Fuel with uniform density without any low fuel density area is fed to the electrode of the spark plug 11, with the result that ignition property is improved. In other words, spray fuel is received by air through forward tumble flow, and is fed to the spark plug mounted on the cylinder head. So the feed distance is short, and diffusion to the surrounding area is minimized. This reduces the amount of spray fuel deposited on the top surface of the piston and the inner wall of the cylinder, and the density of the spray fuel close to the spark plug is kept high and is made uniform, thereby improving ignition property by spark plug.

As a result, the operation range of this engine can be expanded to include stratified operation ranging from the idling range to the high speed range, and the amount of spray fuel deposited on the top surface of the piston and the inner wall of the cylinder can be reduced. This, in turn, reduces the amount of THC in exhaust gas, and improves the purification rate and fuel economy at the same time.

The following describes the direct injection engine as a second embodiment according to the present invention:

The direct injection engine according to the present embodiment has basically the same function as that of the direct injection engine according to the first embodiment, where differences are found only in the configuration of the swirling grooves 16 of the fuel swirling member 17 of the fuel injector 10 of the direct injection engine, and installation of the fuel injector 10 on the direct injection engine. These differences will be mainly described below, with the overlapping description of these two embodiments being omitted.

Figure 14A:
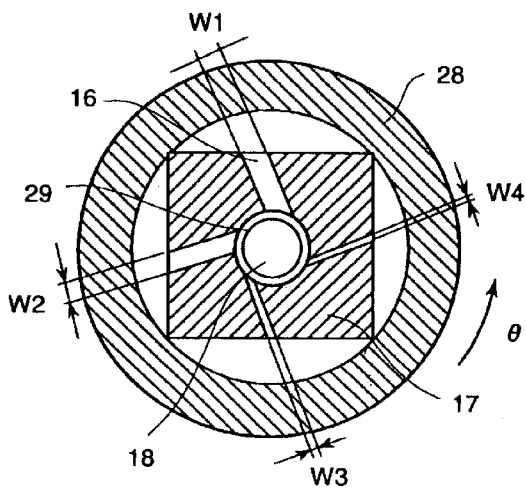
FIGS. 14(a) and 14(b) are drawings illustrating the transverse section of the nozzle of the fuel injector mounted on the direct injection engine according to the second embodiment of the present invention, and spray fuel density distribution of the fuel injector.
Figure 14B:
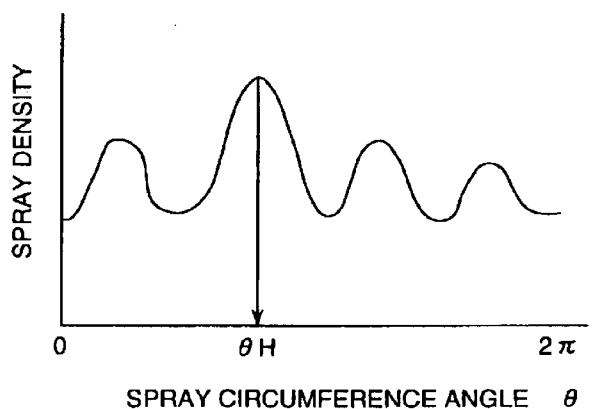

FIG. 14 represents spray fuel density distribution when the swirling grooves 16 of the nozzle 30 of the fuel injector 10 according to the present embodiment are assumed to have different widths. (a) indicates the transverse section of the nozzle 30. The fuel injector 10 has four swirling grooves 16 of the fuel swirling member 17. swirling grooves 16 are each arranged in offset state, and these groove have different widths W1, W2, W3 and W4. Since swirling grooves 16 have different widths W1, W2, W3 and W4, difference in spray fuel density appears in a sharp contrast according to the difference in the angular position of the conical spray fuel in the radial direction, as shown in (b). In other words, the fuel concentration on the angle θ H equivalent to swirling groove 16 where width W1 is increased appears higher than other swirling grooves 16.

Figure 15A:
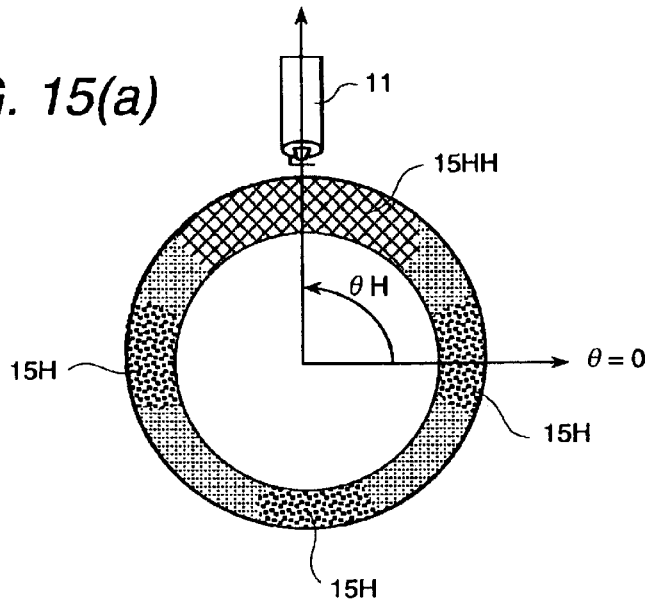
FIGS. 15(a) and 15(b) are drawings illustrating the spray fuel density distribution of the fuel injector in the direct injection engine of FIG. 14(a), and installation of the valve on the engine.
Figure 15B:
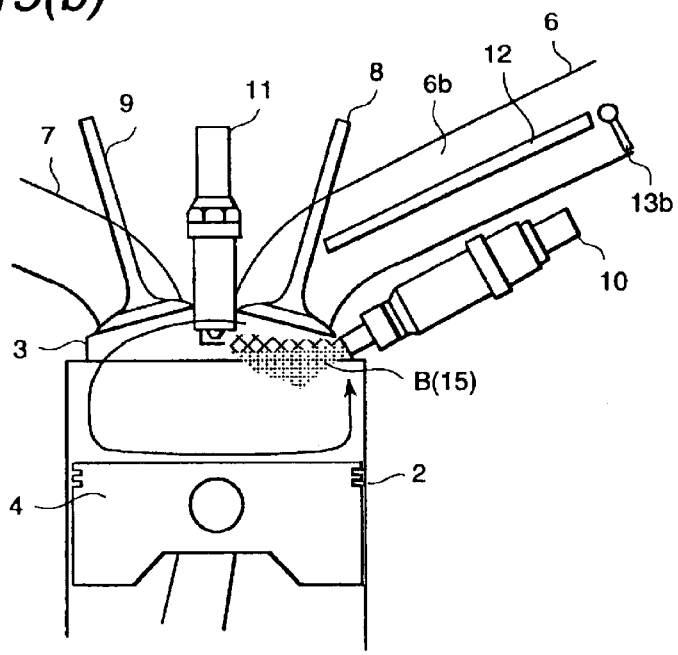

FIG. 15 shows how to install the fuel injector 10 of FIG. 14 on the direct injection engine. As shown in (a) and (b), the fuel injector 10 is mounted on the direct injection engine to ensure that the portion of the conical spray fuel having a higher fuel concentration is located on the side of the electrode 11a of the spark plug 11. As described above, spray fuel of higher concentration is supplied to the electrode 11a of the spark plug 11 by installation of the fuel injector 10. This improves ignition property, and reduces the amount of fuel deposited on the piston 4 and inner wall of the cylinder block, because of a relative reduction in the concentration of conical spray fuel at the portion away from the electrode 11a.

Figure 16A:
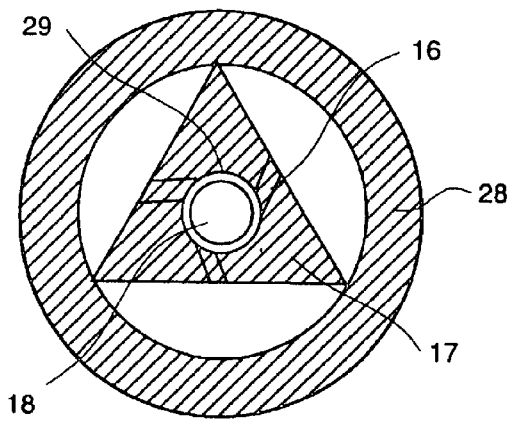
FIGS. 16(a) and 16(b) are drawings representing the transverse cross section of the nozzle provided with the swirling groove different from that in FIG. 14a in another example of the fuel injector of the second embodiment, spray fuel density distribution, and installation on the engine.
Figure 16B:
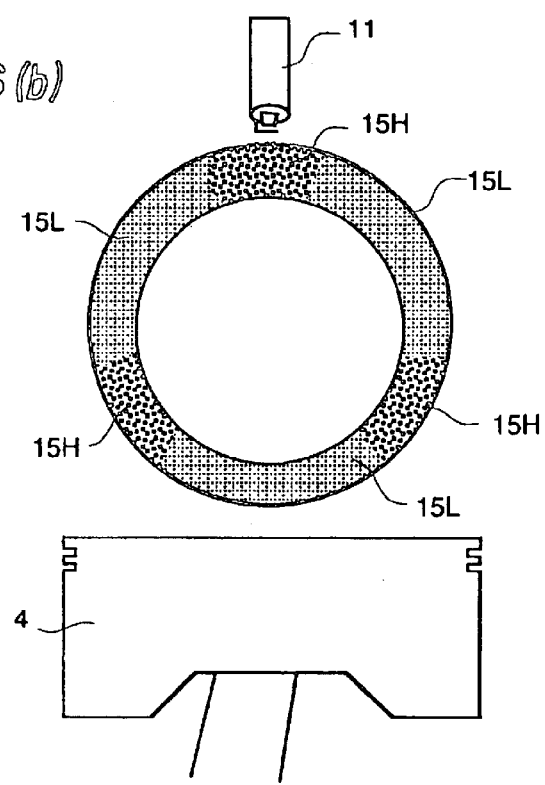

FIG. 16 shows another example of the fuel injector 10 according to the present embodiment. (a) shows a cross section of the nozzle 30 and (b) represents a layout relationship between spray fuel and the electrode 11a of the spark plug 11. As shown in (a), the fuel injector 10 has three swirling grooves 16 of the fuel swirling member 17, and swirling grooves 16 are equally offset and arranged at an equally spaced interval. The high spray density portion 15H of the conical spray fuel injected from the fuel injector 10 is generated in three positions at an equally spaced interval, as shown in (b). Other portions are has a low spray density 15L. In the relationship with the spark plug 11, arrangement is made to ensure that fuel is injected when the high fuel density portions 15H as one of three high fuel density portions 15H is placed close to the electrode 11a of the spark plug 11. As described above, when the fuel injector 10 is mounted on the direct injection engine, spray fuel with high concentration can be sent to the electrode 11a of the spark plug 11. This ensures improved fuel ignition and the conical spray fuel close to the piston 4 forms a low spray density portion 15L. This reduces the amount of fuel deposited on the top surface of the piston 4.

Figure 17A:
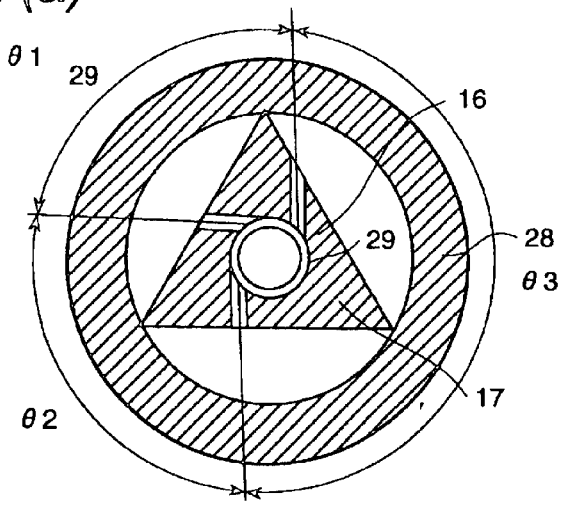
FIGS. 17(a) and 17(b) are drawings representing the transverse cross section of the nozzle provided with the swirling groove different from that of FIG. 16(a) in a further example of the fuel injector of the second embodiment, spray fuel density distribution, and installation on the engine.
Figure 17B:
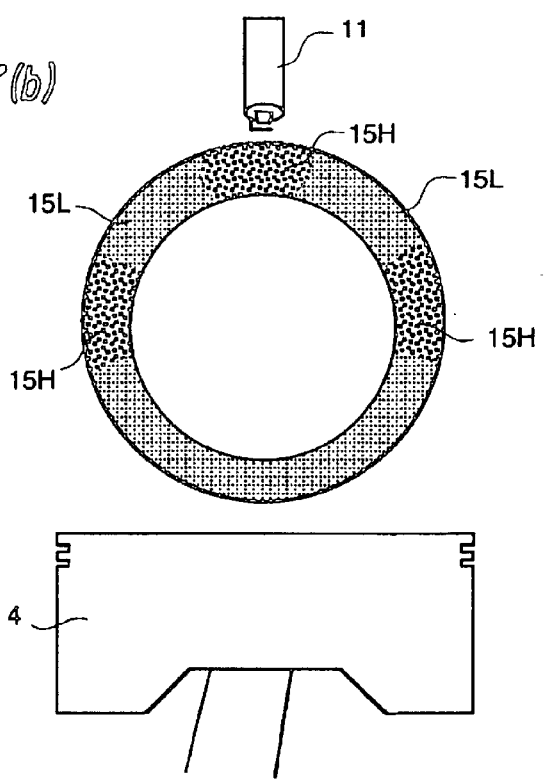

FIG. 17 represents still another example of the fuel injector 10 of FIG. 16, where (a) is a cross sectional view representing the fuel nozzle 30, and (b) shows the layout relationship between spray fuel and the electrode 11a of the spark plug 11. The difference from the fuel injector 10 of FIG. 16 is that three swirling grooves 16 are arranged in angular layouts θ1, θ2 and θ3 with different intervals, not at equally spaced intervals. In the relationship with the spark plug 11, arrangement is made to ensure that fuel is injected when the high fuel density portions 15H as one of three high fuel density portions 15H is placed close to the electrode 11a of the spark plug 11, and the remaining two high fuel density portions 15H are sprayed in the upper area wherever possible. This arrangement provides the same function as that of the fuel injector 10 of FIG. 15.

Figure 18A:
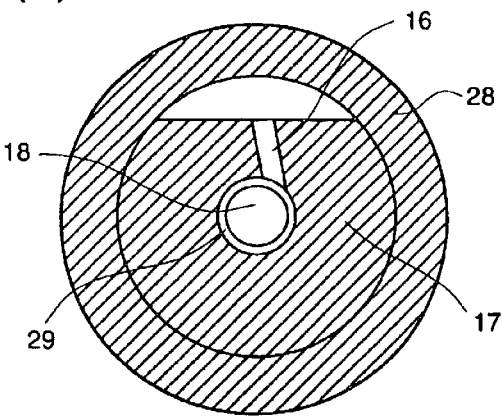
FIGS. 18(a) and 18(b) are drawings representing the transverse cross section of the nozzle provided with the swirling groove different from that of FIG. 17(a) in a still further example of the fuel injector of the second embodiment, spray fuel density distribution and installation on the engine.
Figure 18B:
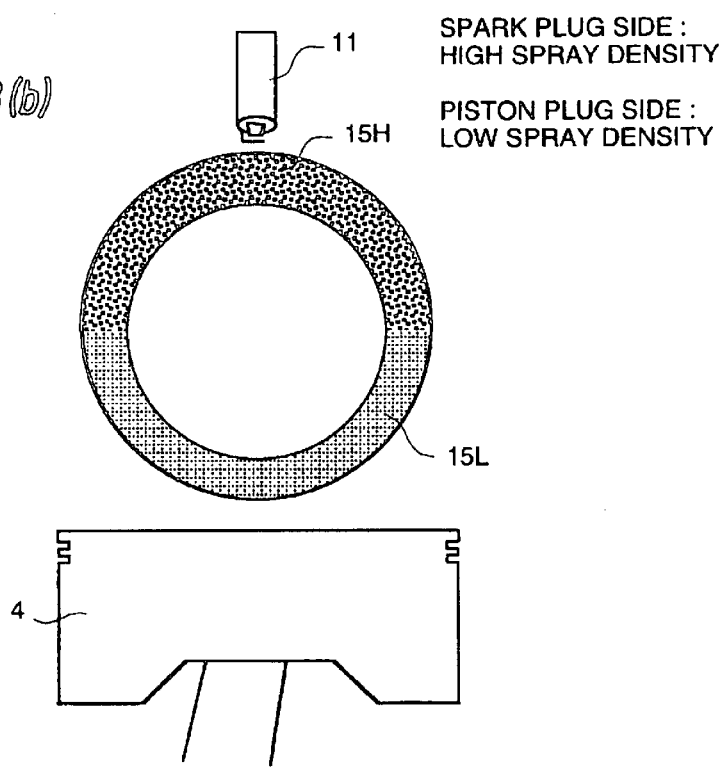

FIG. 18 represents a still further example of the fuel injector 10 according to the present embodiment, wherein (a) is a cross sectional view representing the fuel nozzle 30, and (b) shows the layout relationship between spray fuel and the electrode 11a of the spark plug 11. As shown in (a), the fuel injector 10 has one swirling groove 16 of the fuel swirling member 17, and the swirling groove 16 is arranged in offset layout. The conical spray fuel injected from the fuel injector 10 is produced in two separate portions; high spray density portion 15H and low spray density portion 15L, as shown in (b). In the relationship with the spark plug 11, arrangement is made to ensure that fuel is injected when the high fuel density portions 15H is placed close to the electrode 11a of the spark plug 11. As described above, spray fuel of higher concentration is supplied to the electrode 11a of the spark plug 11 by installation of the fuel injector 10 on the direct injection engine. This improves ignition property, and reduces the amount of fuel deposited on the piston 4 and inner wall of the cylinder block, because the conical spray fuel close to the piston 4 has a low spray density 15L.

The above is the detailed description of two embodiments of the present invention. However, the present invention is not restricted to these embodiments. Various designing variations are possible without departing from the spirit of the present invention described in claims.

In the first embodiment, for example, examples have been disclosed wherein the number, width and layout position of swirling grooves of the fuel injector have been modified to ensure that density of the conical spray fuel injected from the fuel injector is homogenized in the radial direction. To achieve homogenization of fuel density, the fuel injector of FIGS. 19 and 20 can be configured. The fuel injectors of different configurations allow the fuel density of the conical spray fuel to be homogenized not only in the radial direction but also in the interior.

Figures 19A, 19B, 19C:
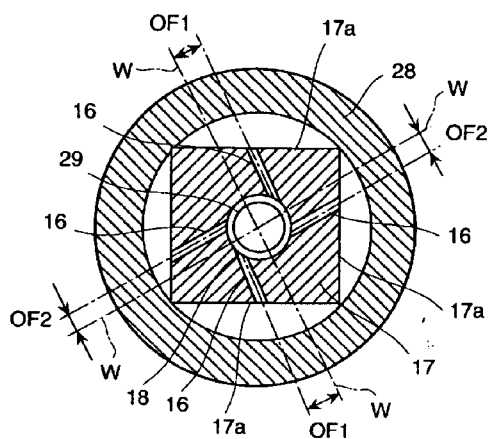
FIGS. 19(a)–19(c) are drawings representing the transverse cross section of the nozzle provided with the swirling groove in still another example of the fuel injector of the first embodiment, and spray fuel density distribution.
Figure 20A:
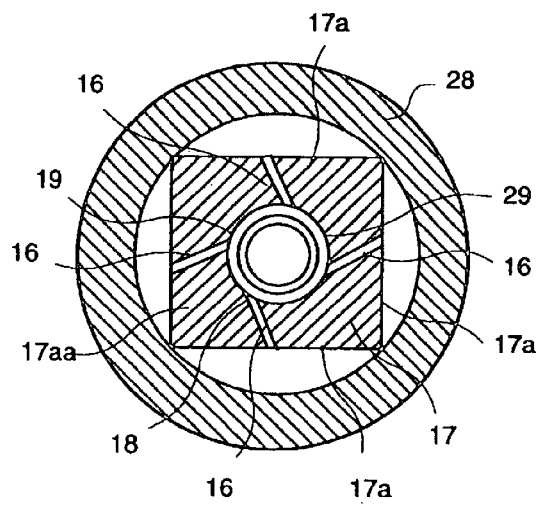
FIGS. 20(a)–20(c) are drawings representing the transverse cross section of the nozzle provided with the swirling groove and annual groove in still another example of the fuel injector of the first embodiment, and spray fuel density distribution.
Figure 20B:
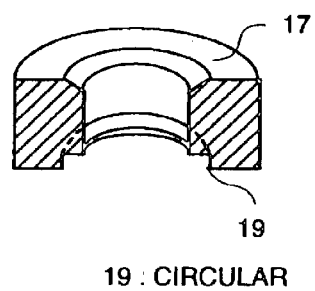
Figure 20C:
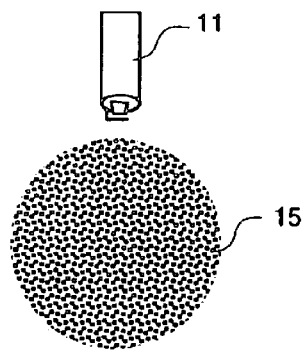
Figure 20C:
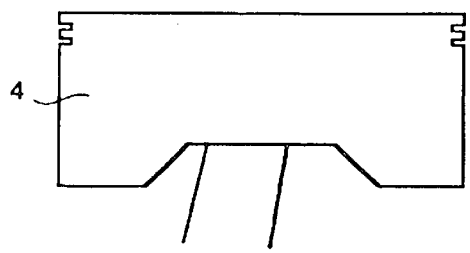

In FIG. 19, the fuel swirling member 17 is square in form having the round hole 29 at the center as shown in (a). Four swirling grooves 16 having different offset widths OF1, OF2, OF3 and OF4 are formed from each side 17a of the square form to the round hole 29 with respect to the line W radially extending from the axis line Z. If fuel is injected from the fuel injector 10 of the above-mentioned configuration, the fuel is sprayed to the central area 15SL and the peripheral area 15HS immediately after injection, as shown in (b). The injection force FC at the center of the fuel spray produces the force F which pushes the peripheral area 15HS toward the inside. After the lapse of a specified time (t), spray fuel density distribution becomes as shown in (c), and homogenization is realized to the point where fuel including the central portion of the spray fuel is sprayed.

In FIG. 20, the fuel swirling member 17 is square in form having the round hole 29 at the center as shown in (a) and (b). Four swirling grooves 16, . . . having different offset widths are formed from each side 17a of the square form to the round hole 29 with respect to the line W radially extending from the axis line Z. An annular groove 19 is formed on the bottom end of the round hole 29. If fuel is injected from the fuel injector of the above-mentioned configuration, spray fuel density distribution becomes as shown in (c), and homogenization is realized to the point where fuel including the central portion of the spray fuel is sprayed.

Utilization Applicability in Industry

The present invention applies suitably to the direct injection engine comprising a spark plug arranged on the top of the combustion chamber, a fuel injector located on the combustion chamber and an intake air control means installed on the intake manifold. The present invention includes many other variations in terms of the positional relationship between the plug and fuel injector without departing from the present invention. A needle valve as well as ball valve can be used as the fuel injector.

What is claimed is:

1. A direct injection engine wherein an air flow is formed to move from the fuel injector located in a combustion chamber to the spark plug arranged on the top of said combustion chamber, and fuel is sprayed from said fuel injector slightly before ignition timing and is carried by said air flow to reach the spark plug exactly at the ignition timing of said spark plug, wherein the fuel sprayed from the fuel injector exhibits a high/low density when viewed from a surface perpendicular to a spray axis line, and wherein the fuel injector is mounted on a said combustion chamber so that a denser fuel spray portion is placed face-to-face with the spark plug.

* * * * *